(12) United States Patent
Hillier

(10) Patent No.: US 7,680,754 B2
(45) Date of Patent: Mar. 16, 2010

(54) SYSTEM AND METHOD FOR EVALUATING DIFFERENCES IN PARAMETERS FOR COMPUTER SYSTEMS USING DIFFERENTIAL RULE DEFINITIONS

(75) Inventor: Andrew D. Hillier, Toronto (CA)

(73) Assignee: Cirba Inc., Richmond Hill (CA)

( * ) Notice: Subject to any disclaimer, the term of this patent is extended or adjusted under 35 U.S.C. 154(b) by 390 days.

(21) Appl. No.: 11/535,308

(22) Filed: Sep. 26, 2006

(65) Prior Publication Data

US 2007/0250621 A1    Oct. 25, 2007

Related U.S. Application Data

(60) Provisional application No. 60/745,322, filed on Apr. 21, 2006.

(51) Int. Cl.
G06F 17/00 (2006.01)
G06N 5/02 (2006.01)
(52) U.S. Cl. ........................................ 706/47
(58) Field of Classification Search .................... 706/47
See application file for complete search history.

(56) References Cited

U.S. PATENT DOCUMENTS

| | | | | |
|---|---|---|---|---|
| 6,148,335 | A * | 11/2000 | Haggard et al. | 709/224 |
| 6,412,012 | B1 | 6/2002 | Bieganski et al. | |
| 6,487,723 | B1 | 11/2002 | MacInnis | |
| 6,564,174 | B1 | 5/2003 | Ding et al. | |
| 6,654,714 | B1 | 11/2003 | Gentile et al. | |
| 6,662,364 | B1 * | 12/2003 | Burrows et al. | 718/102 |
| 6,898,768 | B1 * | 5/2005 | Theodossy et al. | 716/5 |
| 2005/0044270 | A1 * | 2/2005 | Grove et al. | 709/238 |
| 2005/0209819 | A1 | 9/2005 | Wehrs et al. | |
| 2007/0094375 | A1 | 4/2007 | Snyder et al. | |
| 2007/0150479 | A1 | 6/2007 | Issa et al. | |

FOREIGN PATENT DOCUMENTS

WO   WO 2004/084083 A1   9/2004

OTHER PUBLICATIONS

Mountain, J. & Enslow, Jr. P. "Application of the Military Computer Family Architecture Selection Criteria," ACM SIGARCH Computer Architecture News, vol. 6, Issue 6, 1978, pp. 3-17.*

(Continued)

*Primary Examiner*—David R Vincent
*Assistant Examiner*—Li-Wu Chang
(74) *Attorney, Agent, or Firm*—Brett J. Slaney; John R. S. Orange; Blake, Cassels & Graydon LLP

(57) ABSTRACT

A method for evaluating the differences between computer systems is provided. The systems are evaluated using one or more differential rule definitions and one or more differential rule sets. The rules evaluate the differences between specific parameters in the computer systems and are used to generate a score that indicates how different the systems are based on these parameters and preferably what the cost to remedy the difference would be. The rules can be used for consolidation analysis, compliance analysis etc. The rules each include a weight that quantifies the importance of the rule to compatibility and the score is affected accordingly. Systems can be evaluated against each other or against themselves at different instances in time.

20 Claims, 17 Drawing Sheets

OTHER PUBLICATIONS

Tanenbaum, Andrew S. et al; Distributed Systems; Principles and Paradigms; US Ed edition; Jan. 15, 2002; pp. 22-42, 326-336; Prentice Hall.

Hillier, Andrew; "A Quantitative and Analytical Approach to Server Consolidation" dated Jan. 2006, published at least as early as Feb. 3, 2006; CiRBA Inc.; Technical Whitepaper.

Hillier, Andrew; "Data Center Intelligence" dated Mar. 2006, published at least as early as Apr. 1, 2006; CiRBA Inc.; Technical Whitepaper.

Spellman, Amy et al.; "Server Consolidation Using Performance Modeling"; IT Professional; Sep./Oct. 2003; pp. 31-36; vol. 5, No. 5.

International PCT Search Report from PCT/CA2007/000675.

* cited by examiner

Differential Rule Definition

| Rule Type | Rule Specifier | Source | Target | Weight | Mutex Flag | Match Flag | Supress Flag | Remediation Cost | Description |
|---|---|---|---|---|---|---|---|---|---|
| a | b | c | d | % | Y/N | e | f | $ | g |

Figure 4

| # | Rule Type | Rule Specifier | Baseline | Target | Weight | Mutex Flag | Match Flag | Suppress Flags | Remediation Cost | Description |
|---|---|---|---|---|---|---|---|---|---|---|
| 1 | AliasQuery | OS | | | 70% | | OS | | $1,200 | Different Operating Systems |
| 2 | AliasQuery | OS Version | | | 30% | | VER | OS | $320 | Different Operating System Versions |
| 3 | AliasQuery | Time Zone | | | 20% | | | | $320 | Systems are in Different Time Zones |
| 4 | AliasQuery | Total memory | | < | 5% | | | | $350 | Target Has Less Memory |
| 5 | UriQuery | cirba-cm/ServerInformation/OSPatchLevel | | | 5% | | PATCH | OS VER | $160 | Different Patch Levels |
| 6 | UriQuery | cirba-pa/patchesTable#* | | | 5% | Y | | OS VER | $80 | Patch Differences Between Systems |
| 7 | UriQuery | cirba-cm/ServerInformation/OSKernelBits | | | 10% | | | OS | $80 | Not Running Same Kernel Bits |
| 8 | UriQuery | cirba-cm/KernelParametersTable#* | present | absent | 5% | Y | | OS | $80 | Some Kernel Parameters are Absent |
| 9 | UriQuery | cirba-cm/KernelParametersTable/Setting#SHMMAX | | < | 5% | | | | $80 | Maximum Shared Memory Settings Differ |
| 10 | UriQuery | cirba-si/appInvTableTable.appInvTableTable/version#oracle | | | 5% | | | | $3,000 | Different Version of Oracle |
| 11 | UriQuery | cirba-si/appInvTableTable.appInvTableTable/version#oracle | 9 | 8 | 4% | | | | $1,500 | Different Version of Oracle |
| 12 | UriQuery | cirba-si/appInvTableTable.appInvTableTable/version#apache | | | 2% | | | | $80 | Different Version of Apache |
| 13 | UriQuery | win32-os/Win32_OperatingSystem/ServicePackMajorVersion | | | 5% | | PATCH | OS VER | $160 | Different Service Pack Levels |
| 14 | UriQuery | win32-quickfix/win-hotfix#* | present | absent | 5% | Y | | OS VER | $80 | Patch Differences Between Systems |
| 15 | UriQuery | win32-os/Win32_StartupCommand#* | | | 2% | Y | | OS | $80 | Startup Commands are Different |
| 16 | UriQuery | win32-misc/Win32_Environment/VariableValue#Path | | | 2% | | | OS | $80 | Global Path is Different |
| 17 | UriQuery | win32-misc/Win32_Environment/VariableValue#Path <SYSTEM> | | | 2% | | | OS | $80 | System Path is Different |
| 18 | UriQuery | win32-os/Win32_Service#* | present | absent | 5% | Y | | OS | $160 | Some Services not On Target |
| 19 | UriQuery | win32-os/Win32_Service/Started | | | 1% | Y | | OS | $80 | Some Services not Started On Target |
| 20 | UriQuery | win32-application/win-products#McAfee VirusScan Enterprise | present | absent | 5% | | | OS | $200 | McAfee Not On Target |

Consolidation & Virtualization Analysis Strategy Instrumentation Enablement — 100

Key: 102
- x - Detailed Coverage
- o - Partial Coverage or Requires Customization

| | Configuration Sources (SCI Analysis) ||||||||||||||||| Workload Sources (WCI) |||||||
| --- | --- | --- | --- | --- | --- | --- | --- | --- | --- | --- | --- | --- | --- | --- | --- | --- | --- | --- | --- | --- | --- | --- | --- | --- |
| | CRBA Agents || CRBA Agentless ||||| Third Party Agents (Direct Audit) ||||| CRBA Framework Adapter ||| Data Import || CRBA Agent || Data Import |||||
| | SNMP Agent | WMI Provider | SNMP | SSH | WMI | SQL | JMX | Compaq IM | Dell OM | IBM Director | Concord, etc. | VMware ESX | Tivoli TMF | BMC | SunMC | TADDM | Tivoli CM | SNMP Agent | WMI Provider | SAR | MS MOM | Perfmon | Compuware | Candle |
| Database Consolidation | | | | | | | | | | | | | | | | | | | | | | | | |
| Oracle database stacking | | | o | x | | x | | | | | | | | | | x | | x | x | x | x | x | x | x |
| Oracle table stacking | | | o | x | | x | | | | | | | | | | o | | x | x | x | x | x | x | x |
| Sybase database stacking | | | | x | | x | | | | | | | | | | x | | x | x | x | x | x | x | x |
| Sybase table stacking | | | | x | | x | | | | | | | | | | o | | x | x | x | x | x | x | x |
| SQL Server - database stacking | | | | | o | x | | | | | | | | | | x | | | x | | x | x | x | x |
| SQL Server - table stacking | | | | | o | x | | | | | | | | | | o | | | x | | x | x | x | x |
| OS-Level Stacking | | | | | | | | | | | | | | | | | | | | | | | | |
| UNIX Binary Compatibility | x | | o | | | | | | | | o | | x | | x | x | | x | | x | | | x | x |
| Linux Binary Compatibility | x | | o | x | | | | | | | o | | x | o | x | x | | x | | x | | | x | x |
| UNIX Apps with file-based configuration | x | | | x | | | | | | | | | x | o | x | x | | x | | x | | | x | x |
| UNIX Apps with database-resident configurations | | | | | | x | | | | | | | | | | x | | | | | | | x | x |
| Windows Binary Compatibility | | x | o | | x | | | x | x | x | | | x | o | | x | o | | x | | x | x | x | x |
| Windows Apps with file-based configurations | | x | | | o | | | | | | | | x | o | | x | o | | x | | x | x | x | x |
| Windows Apps with WMI-based configurations | | x | | | x | | | | | | | | | | | x | | | x | | x | x | x | x |
| Windows Apps with database-resident configurations | | | | | o | x | | | | | | | | | | x | | | | | | | x | x |
| Application Server Stacking | | | | | | | | | | | | | | | | | | | | | | | | |
| WebLogic | | | x | | | | x | | | | | | | | | | | | | | | x | x | x |
| Websphere | x | | | | | | x | | | | | | | | | | | | | | | x | x | x |
| IIS | | | | | x | | x | | | | | | | | | | | | x | | x | x | x | x |
| JBOSS | | | | | | | x | | | | | | | | | | | | | | | x | x | x |
| Apache Tomcat | | | | | | | x | | | | | | | | | | | | | | | x | x | x |
| Virtualization Analysis | | | | | | | | | | | | | | | | | | | | | | | | |
| UNIX Hardware Variance | x | | o | x | | | | x | | | o | | x | o | x | x | o | x | | x | | | x | x |
| Linux Hardware Variance | x | | o | x | | | | x | x | x | o | | x | o | x | x | o | x | | x | | | x | x |
| UNIX Shared OS (Zone) Analysis | x | | o | x | | | | | x | x | o | o | x | o | x | x | o | x | | x | | x | x | x |
| Wintel Hardware Variance | | x | o | | x | | | x | x | x | o | o | | | | x | o | | x | | x | x | x | x |
| Windows Shared OS (Zone) Analysis | | x | o | | x | | | x | x | x | o | o | | | | x | o | | x | | x | x | x | x |

104 → Key
105 → Oracle table stacking row area

AUDIT NAME: Company X
DESCRIPTION: Server Consolidation   } 112   ~110
                                      /114

REQUEST TYPE: SNMP ▽   ←116
REQUEST PARAMETERS:

| NAME | Value |
|---|---|
| SNMP Version | 1 |
| Port | 3161 |
| Comm. String | public |

←118

REQUEST TEMPLATES:   /120
/Database_Settings /IETF_Network_Services
/Installed_Patches / Patch_Auditor
/System_Information/Security_Details
  •
  •
  •
  •
  •
  •
  •
  •

[EDIT]

AUDIT TARGETS:   ~122
Server A
Server B
Server C
Server D
[EDIT]

[SAVE]  [AUDIT]  [CANCEL]  } 124

FIGURE 10

| DATA ELEMENT | CONDITIONAL FLAGS | SOURCE, TARGET INSTANCE | WEIGHT | DESCRIPTION | Remediation Cost | MUTEX |
|---|---|---|---|---|---|---|
| SYS_NAME | | | 0.5 | Diff. O/S | — | |
| O/S_Kernel_Bits | | | 0.1 | Not same kernel bits | — | |
| TIME_ZONE | | | 0.02 | Different time zones | — | |
| ⋮ | ⋮ | ⋮ | ⋮ | ⋮ | | |

FIGURE 12

AUDIT NAME: CompanyX.CH1

| TIMESTAMP | TARGETS | FAILED |
|---|---|---|
| MO/DAY/YEAR TIME | 4 | 0 |
| [DELETE] | ~152 | ~150 |

REPORT CATEGORY: [OPTIMIZATION ▽]  ←154

REPORT TYPE: [SYSTEM COMPATIBILITY ▽]  ←156
WORKLOAD COMPATIBILITY

REPORT PARAMETERS:
NAME          Value
158→ ABC123   [UNIX ▽]        ~160
              [CPU Utilization] → USAGE LIMIT [ ]

TARGETS:
[REMOVE] CompanyX.CH1 | AUDIT History | MO/DAY/Year TIME   ←162

[GENERATE] ~164

FIGURE 13

SCI SCORECARD:

SORT ROW      SORT COLUMN

| SCI % | SERVER A | SERVER B | SERVER C | SERVER D |
|---|---|---|---|---|
| SERVER A | 100 | 90 | 83 | 57 |
| SERVER B | 90 | 100 | 79 | 57 |
| SERVER C | 83 | 79 | 100 | 57 |
| SERVER D | 52 | 52 | 52 | 100 |

DIFFERENCES: (MIGRATING A to D)

| Description | Weight |
|---|---|
| Different O/S Versions | 30% |
| Different Time Zones | 2% |
| ⋮ | ⋮ |

DIFFERENCE DETAILS:

178

| Module | Object | Property | Instance | Baseline | Target | Weight | Remed. Cost |
|---|---|---|---|---|---|---|---|
| Config. Monitor | Name Service Locale settings | Value Time Zone | ipnodes | files US/Eastern | files.dns Canada/Eastern | 2% | — |
| ⋮ | ⋮ | ⋮ | ⋮ | ⋮ | ⋮ | ⋮ | ⋮ |

176

FIGURE 16 ically used in environments that require at least
SYSTEM AND METHOD FOR EVALUATING DIFFERENCES IN PARAMETERS FOR COMPUTER SYSTEMS USING DIFFERENTIAL RULE DEFINITIONS This application claims priority from U.S. provisional patent application No. 60/745,322 filed Apr. 21, 2006.

FIELD OF THE INVENTION

The present invention relates to information technology infrastructures and has particular utility in evaluating computer systems in such infrastructures.

DESCRIPTION OF THE PRIOR ART

Devices that utilize computing power such as servers, personal computers, laptops, personal digital assistants (PDA) etc., are typsome form of standard operation, control, communication protocol, interface etc. Such devices often require upgrades, patches and security features that can change on a periodic basis.

For computing devices to communicate with each other and the supporting infrastructure, they should be compatible and up to date. As organizations become more reliant on computing devices of all types to perform day-to-day activities, so does the need increase to periodically update and repair devices to minimize downtime and inefficiencies. Such a need extends beyond central and/or distributed computing environments to mobile devices, virtual networks etc.

As organizations grow and the necessary IT infrastructures also grows, the ability to repair, upgrade, consolidate and evaluate computer systems becomes difficult to manage.

It is therefore an object of the following to obviate or mitigate the above-described disadvantages.

SUMMARY OF THE INVENTION

In one aspect, a method of evaluating differences between a first data set and a second data set for one or more computer system comprising obtaining the first data set and the second data set; selecting a parameter according to a differential rule definition; comparing the parameter in the first data set to the parameter in the second data set; determining if a difference in the parameter exists between the data sets; if the difference exists, applying a weight indicative of the relative importance of the difference in the parameter according to the differential rule definition; and providing an evaluation of the difference according to the weight.

In another aspect, a computer readable differential rule definition for evaluating differences between a first data set and a second data set for one or more computer system is provided comprising a parameter for the one or more computer system; and a weight for the parameter indicative of the importance of a difference in the parameter; wherein the differential rule definition is used by a computer application to perform an evaluation of the difference according to the weight.

BRIEF DESCRIPTION OF THE DRAWINGS

An embodiment of the invention will now be described by way of example only with reference to the appended drawings wherein:

FIG. 4 illustrates a general rule definition.

FIG. 5 shows an example rule set.

FIG. 8 is a table illustrating data enablement for system consolidation and virtualization.

FIG. 10 is an audit request template.

FIG. 12 is a table containing a rule set used in generating an SCI matrix.

FIG. 13 is a screenshot of a program for generating compatibility reports.

FIG. 14 is an SCI matrix for an example environment having four server systems.

FIG. 15 is a table containing a summary of differences between a pair of systems in the environment.

FIG. 16 is a table containing details of the differences listed in FIG. 16.

DETAILED DESCRIPTION OF THE INVENTION

Figure 1:
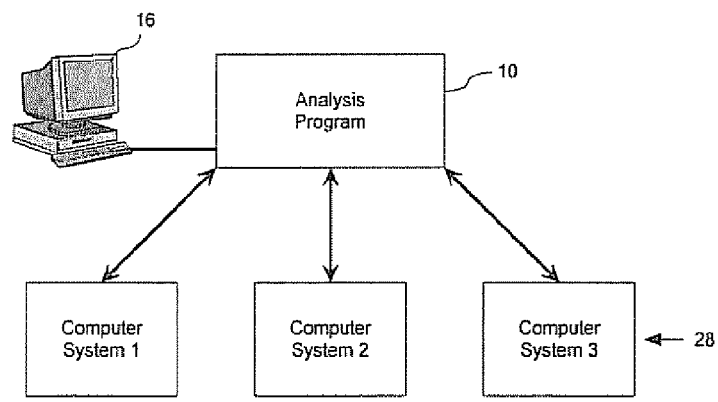
FIG. 1 is a schematic representation of a system for analyzing computer systems.

Referring therefore to FIG. 1, an analysis program 10 is in communication with a set of computer systems 28 (3 are shown in FIG. 1 as an example). The analysis program 10 is used to evaluate differences between the computer systems 28 and provide a report showing how the systems differ. The computer systems 28 may be physical systems as well as virtual systems or models.

For the following description, a general evaluation of differences between systems uses the following nomenclature: A target system refers to a system being evaluated, and a baseline system is a system to which the target system is being compared. The baseline and target systems may be the same system at different instances in time (baseline=prior, target=now) or may be different systems being compared to each other. As such, a single system can be evaluated against itself to indicate changes with respect to a datum as well as how it compares to its peers.

In some scenarios, alternative nomenclature can be used. For example, a baseline system may instead be referred to as a source system, e.g. for consolidation analyses. In such a scenario, the source system is the system from which applications are moved, and the target system is the system to which such applications are moved. It will be appreciated that the terms "source system" and "baseline system" are herein generally synonymous, whereby a source system is a type of baseline system.

Figure 2:
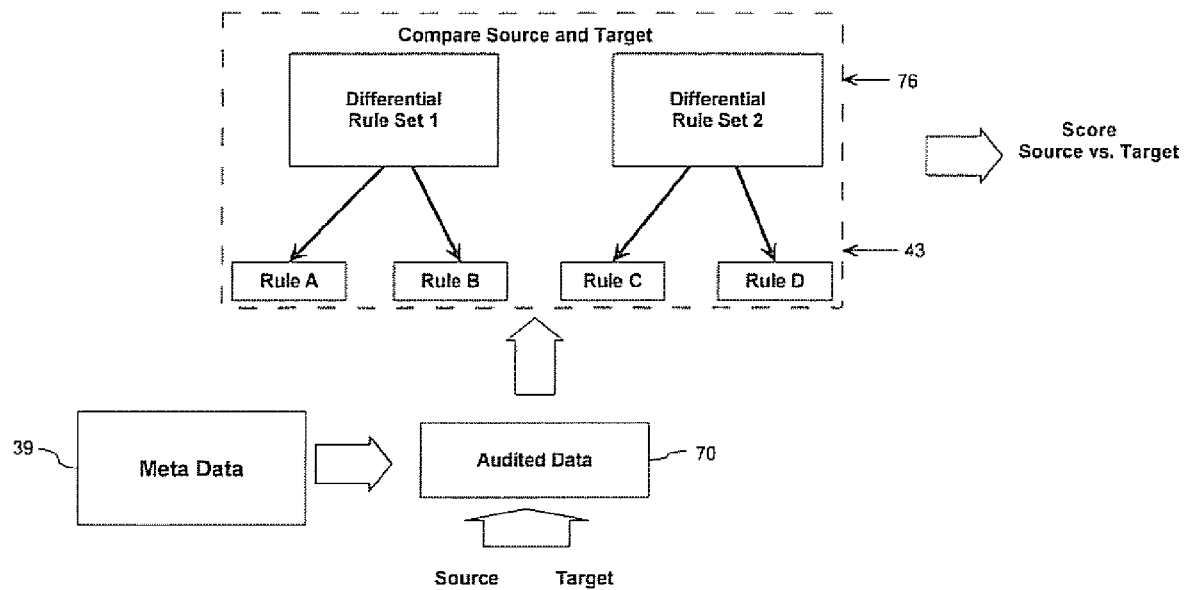
FIG. 2 is a hierarchical block diagram illustrating meta data, rules and rule sets.

FIG. 2 illustrates a visual representation of the relationships between data used by the analysis program 10. Audited data 70 is obtained from the baseline and target computer systems 28 and is used to evaluate the differences between the systems 28. A distinct data set is preferably obtained for each system 28 (or instance in time for the same system 28 as required). Each data set comprises one or more parameter that relates to characteristics or features of the respective system 28. The parameters can be evaluated by scrutinizing program definitions, properties, objects, instances and any other representation or manifestation of a component, feature or characteristic of the system 28. In general, a parameter is anything related to the system 28 that can be evaluated, quantified, measured, compared etc.

Metadata 39 describes the meaning of the audited data 70 as it pertains to the analysis. Preferably, comprehensive metadata 39 is included in the analysis program 10 and should be capable of being modified based on the specific application and the nature of the computer systems 28.

Differential rules 43 are conceptually a form of metadata 39 that represent the importance of differences in certain parameters for the baseline and target systems 28, the dependencies between different aspects of the audited data 70, and the costs associated with the remediation of differences between the system parameters.

Differential rule sets 76 are groupings of rules that represent higher-level considerations such as business objectives or administrative concerns that are taken into account when reporting on or analysing the systems 28. In this example, four differential rules 43, A B, C and D, are grouped into two differential rule sets 76, Rule Set 1 and Rule Set 2. It will be appreciated that there may be any number of rules 43 in any number of differential rule sets 76 and those shown in FIG. 2 are for illustrative purposes only.

The differential rules 43 evaluate the differences in parameters in the audited data 70 according to rule definitions. The rule definitions include weights that are indicative of the importance of the differences in particular parameters as they relates to the operation of the systems 28. The weights are applied during an evaluation of the baseline and target systems 28 if the difference exists. The evaluation may include the computation of a score or generation of other information indicative of nature of the difference(s) between the baseline and target systems 28.

Figure 3:
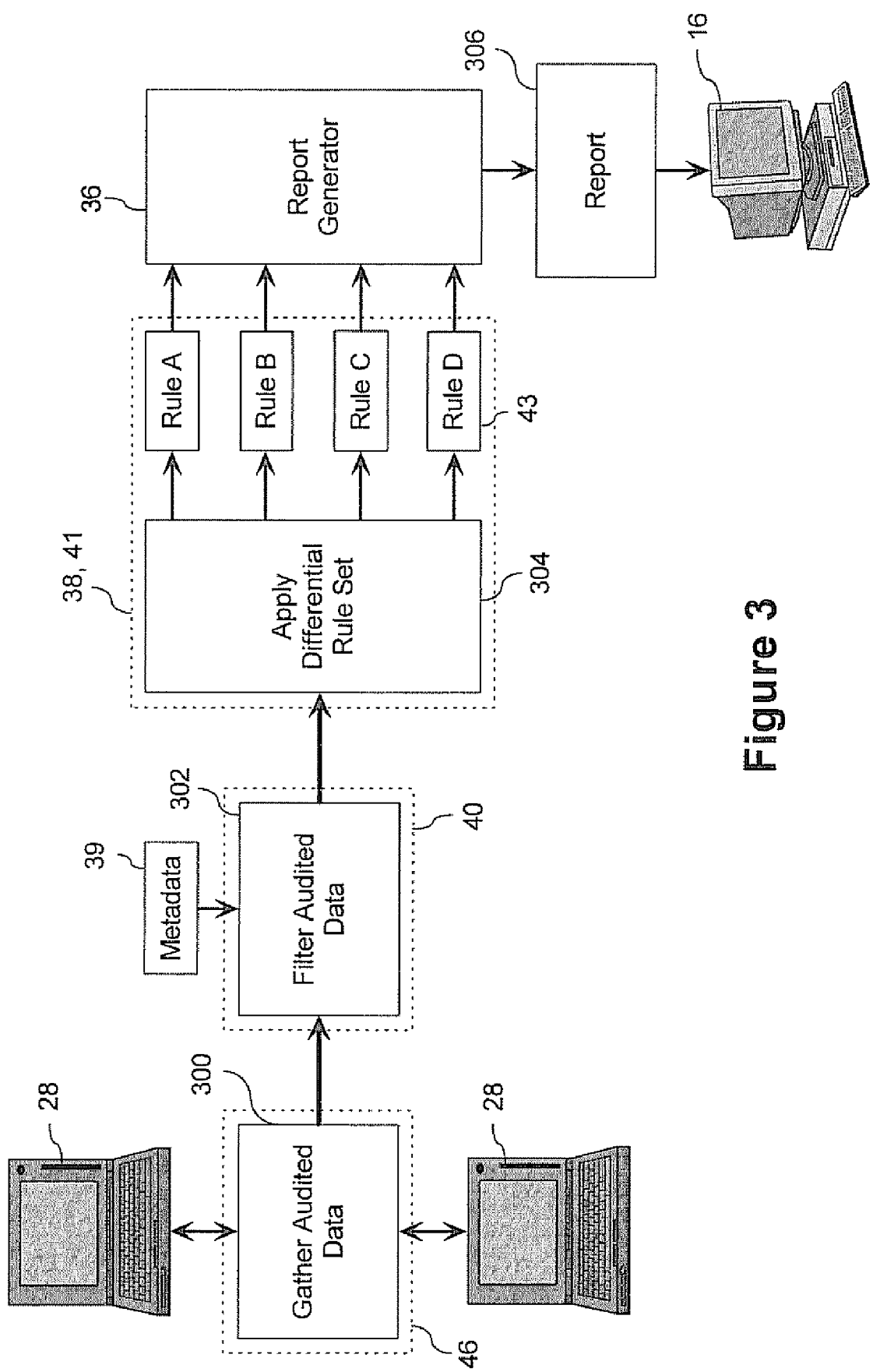
FIG. 3 is a schematic flow diagram showing the application of a rule set in analyzing a pair of computer systems.

The flow of data for applying an exemplary rule set 76 is shown in FIG. 3. In the example shown in FIG. 3, an audit engine 46 gathers audited data at step 300 from a pair of laptop computer systems 28. At step 302, a context engine 40 filters the audited data 70 using metadata 39 to determine which parameters of the laptop computer systems 28 are applicable to the analysis. A differential engine 38 and an analysis engine 41 look at the differences in parameters for the systems 28 and apply a differential rule set at step 304 which in turn evaluates the differential rule definitions for exemplary rules A, B, C and D.

As noted above, the rules 43 evaluate the differences in the baseline and target systems 28 and apply weights that indicate the importance of such differences in the parameters that have been analysed as well as the dependencies between different aspects of the data. The rule sets 76, e.g. Rule Set 1 and Rule Set 2, determine which parameters in the audited data 70 are to be evaluated and the differential rules 43 in the differential rule sets 76 are applied to the differences between the parameters in the baseline and target systems 28 based on the presence of a difference. The difference may simply be whether or not the parameter is different but nature of the difference may also be considered and have weights that vary based on how different the parameter is. As such, the differential rules 43 and corresponding weights may vary accordingly. For example a version 4 operating system versus a version 3 operating system may be considered less costly to remedy and thus less detrimental than a version 5 operating system compared to a version 1 operating system. As can be seen, even though the operating systems are different in both cases, the nature of the difference can also be considered and different weights and/or remedies applied accordingly.

A report generator 36 uses the results of the application of the differential rules 43 to generate a report at step 306, which is then in turn displayed on the computing station 16 for subsequent analysis, use and/or storage.

A general definition for a differential rule 43 is shown in FIG. 4. Each rule definition comprises a number rule fields and the corresponding values. A rule definition can be extended to include any number of rules 43 to form a rule set 76 as shown by way of example only in FIG. 5. The rule definitions are computer readable and storable so that they may be accessed by the program 10 and modified if necessary, for use in evaluating the computer systems 28.

The rule type specifies whether the rule 43 applies to audited data directly (UrlQuery) or normalized values (AliasQuery). The rule specifier specifies the URL of the data object or property that is being evaluated. The optional URL fragment (i.e. the portion after the "#" symbol) specifies the specific object instance (table row) that is being evaluated, with "*" denoting a wildcard that matches all instances, For AliasQuery rules, this field specifies the alias name.

If specified, the source field represents the literal value that would need to match the value of the object/property on the source system in order for the rule 43) to match. For objects and object instances, the keywords "absent" and "present" are preferably used to match cases where that object is absent or present respectively. Similar to the source field, the target field allows a literal match against the value of the object/property on the target system. The target field also supports the absent/present specifiers. For numeric properties, relational operators (>, <, =, !=) can be used to cause the rule 43 to trigger if the target value has the specified relationship with the source value.

The weight field specifies the relative importance of that property and combination of source/target values (if specified) in regard to the overall context of the comparison. Higher values indicate that the condition detected by the rule 43 has a high impact on the target environment.

The mutex flag field can be used to avoid multiple penalties that would otherwise skew the scores. A "Y" in the mutex flag field specifies that multiple matches of the same rule 43 will incur only a single penalty on the overall score (as specified in the weight field), as opposed to multiple accumulating penalties (which is the default behaviour).

The match flag field enables an optional symbolic flag to be "see" when a rule 43 matches, and which can subsequently be used to suppress other rules 43 (through the "Suppress Flags" field). This effectively allows rule dependencies to be modeled in the rule set 76. The suppress flag field allows symbolic flags (as specified in the "Match Flag" field) to be used to suppress the processing of rules. This allows specific checks to be skipped if certain higher-level conditions exist. For example, if the operating systems are different, there is no need to check the patches.

The remediation cost field is preferably optional. The remediation field represents the cost of "fixing" the system(s) (i.e. eliminating the condition or discrepancy detected by the rule 43). When analyzing differences between (or changes to) IT systems this is used to represent hardware/software upgrade costs, administrative costs and other costs associated with making the required changes to the target systems. The calculations behind this field vary based on the nature of the system and the parameter that would need to be added, upgraded etc.

The description field is a lay description of the condition or discrepancy detected by the rule 43. These descriptions are used to provide management-level summaries when processing rule sets 76. The description field can provide as much or as little information as required by the application.

FIG. 5 provides an example rule set 76, which includes a number of rules 43. The following refers to the number indicated in the leftmost column of FIG. 5.

Rule 1 scrutinizes the normalized (AliasQuery) representation of the operating systems (e.g. Windows™, Solaris™, AIX™, Linux™, etc.) on both the source and target systems and heavily penalizes cases where these are different as evident from the high weight factor (70%). Rule 2 penalizes systems that have different operating system versions (e.g. Windows™ NT vs Windows™ 2000), and is suppressed (i.e. not processed) in cases where the systems have different overall operating systems (as detected in the previous rule 43). Rule 3 detects if systems are in different time zones. Rule 4 penalizes combinations of systems where the target has less memory than the source (this is what is referred to as a directional rule 43, which can give differing results if sources and targets are reversed, e.g. asymmetric results). Rule 5 operates directly against audit data and detects cases where the operating system patch level differs. This rule is not processed if either the operating system or the operating system version are different (since this renders the comparison of patches meaningless).

Rule 6 scrutinizes the lists of all patches applied to the source and target systems and penalizes cases where they differ. The mutex flag is set, indicating that the penalty is applied only once, no matter how many patch differences exist. This rule is ignored in cases where either the operating system or operating system version are different. Rule 7 penalizes system combinations of servers that are running the same OS but are configured to run a different number of kernel bits (e.g. 64-bit vs 32-bit), Rule 8 penalizes combinations where there are kernel parameters defined on the source that are not defined on the target. This rule is not applied if the operating systems are different.

Rule 9 scrutinizes a specific kernel setting (SHMMAX, the setting that specifies how much shared memory a system can have) and penalizes combinations where it is set to a lower value on the target than it is on the source system. Rule 10 penalizes combinations of systems that are running different versions of Oracle™. It should be noted that the remediation cost is relatively high, owing to the fact that it will take a software upgrade to eliminate this discrepancy. Rule 11 penalizes combinations of systems that are running different database version, e.g. Oracle™ 9 vs. Oracle™ 8. In some cases the remediation cost can be low where the upgrade is less expensive. Rule 12 penalizes combinations of systems that are running different versions of Apache. It should be noted that the remediation cost is relatively low, as apache is an open source product and the cost of upgrade is based on the hourly cost of a system administrator and how long it will take to perform the upgrade.

Rule 13 scrutinizes a windows-specific area of the audit data to determine if the source and target systems are running different service pack levels. It should be noted that this rule closely mirrors rule 5, which uses a rule specifier that scrutinizes the UNIX™/Linux™ area of the audit data. Rule 14 scrutinizes the lists of all hotfixes applied to the source and target systems and penalizes cases where they differ. This rule closely mirrors rule 6, which scrutinizes patches on UNIX™ and Linux™. Rule 15 detects differing startup commands between systems. Rule 16 is a rule 43 to detect differing Paths between systems, and rule 17 detects differing System Paths between systems.

Rule 18 penalizes system combinations where there are services installed on the source that are not installed on the target. This rule has the mutex flag set, and will therefore only penalize a system combination once, no matter how many services are missing. Rule 19 penalizes system combinations where there are services started on the source that are not started on the target. It should be noted that both the weight and the remediation cost are lower than the previous rule 43, owing to the fact that it is generally easier and less expensive to start a service than install it. Finally, rule 20 penalizes combinations where the target system is missing the virus scanner software.

It will be appreciated that the above described rules 43 and rule set 76 are shown for illustrative purposes only and that any combination of rules 43 can be used to achieve specific goals. For example, rules that are applicable to the OS can be grouped together to evaluate how a system 28 compares to its peers. Similarly, rules pertaining to database, Java applications etc. can also be grouped.

The following illustrates an exemplary application of differential rules 43 for analyzing compatibilities in systems 28 to according to a consolidation strategy. It will be appreciated that the following is only one example of the application of a differential rule 43 and should not be limited to such an example. In the following, the baseline system is referred to a source system whose applications etc. are to be consolidated onto the target system.

Figure 6:
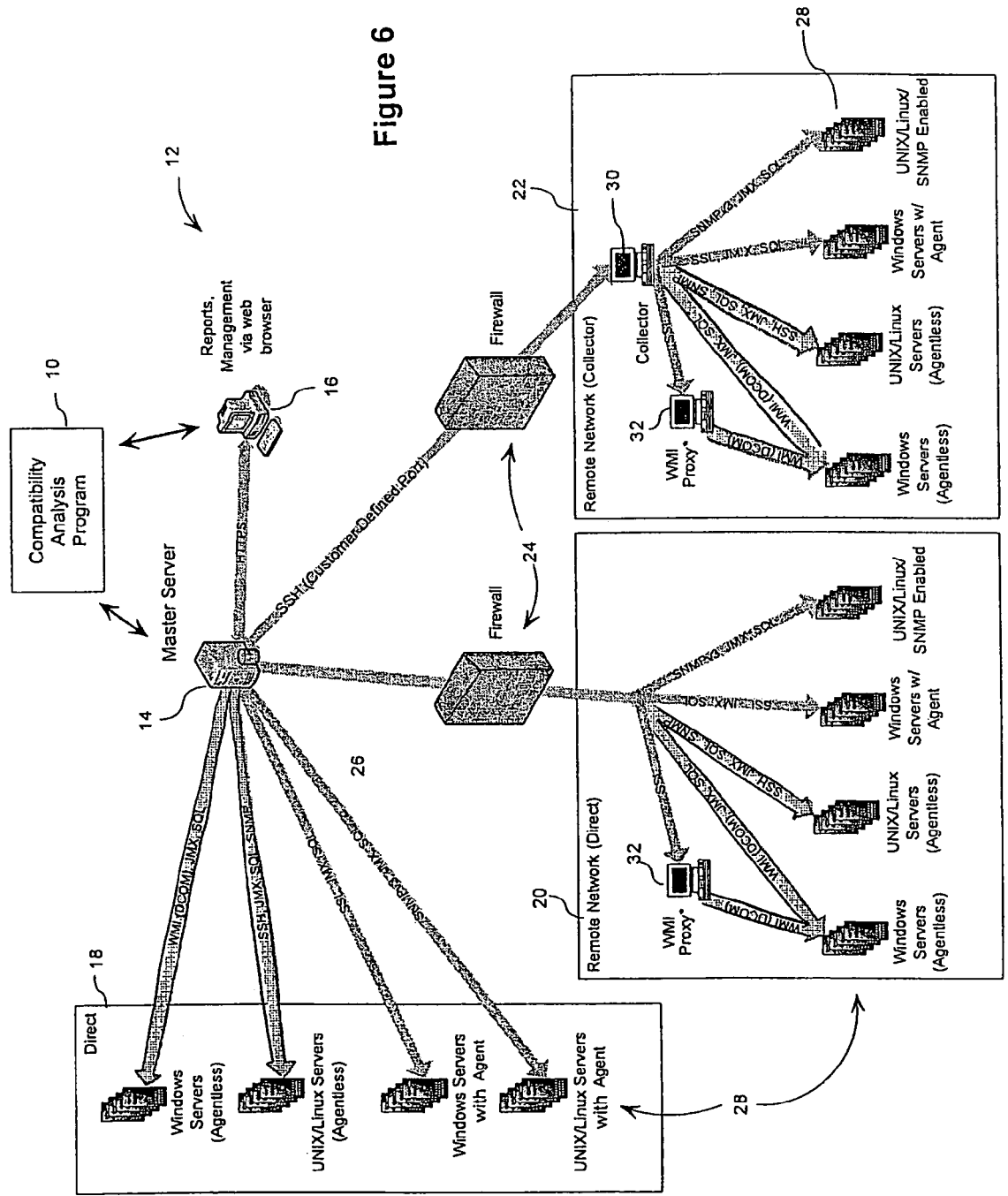
FIG. 6 is schematic representation of a network of systems analyzed by a computer analysis program.
Figure 7:
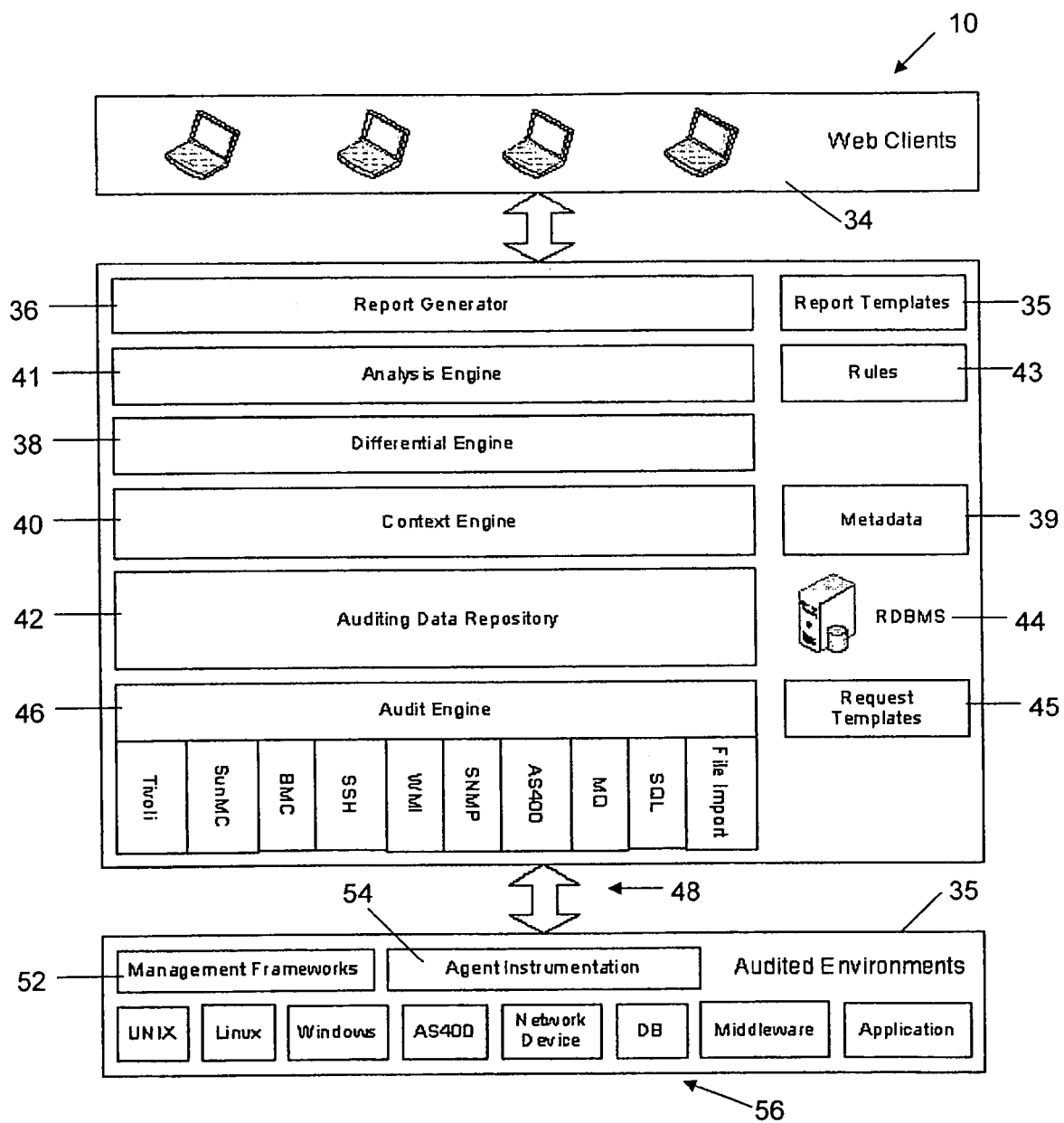
FIG. 7 is a schematic block diagram of an underlying architecture for implementing the analysis program of FIG. 6.

Referring to FIGS. 6 and 7, a compatibility analysis program, generally referred to by numeral 10 for clarity is deployed to gather data from the exemplary architecture shown for a computing environment 12 (shown in FIG. 6) and use the data with a rule set 76 to conduct an evaluation of the systems 28. The analysis program 10 analyzes the environment 12 to determine whether or not compatibilities exist within the environment 12 for consolidating systems such as servers, desktop computers, routers, storage devices etc. The analysis program 10 is preferably part of a client-server application that is accessible via a web browser client 34 running on, e.g. a computer station 16. The analysis program 10 operates in the environment 12 to collect, analyze and report on audited data for not only consolidation but other functions such as inventory analysis, change and compliance analysis etc. In the following examples, the systems are exemplified as servers.

As shown in FIG. 6, the example environment 12 generally comprises a master server 14 that controls the operations of a series of slave servers 28 arranged in a distributed system. In the example shown, the master server 14 audits a local network 18 having a series of servers 28 some having local agents and others being agentless. The master server also audits a pair of remote networks 20, 22 having firewalls 24. The remote network 20 includes a proxy for avoiding the need to open a port range. The remote network 22 comprises a collector 30 for concentrating traffic through a single point allowing an audit to be performed through the firewall 24, and also comprises a proxy 32. The proxy 32 is used to convert between Windows™ protocols and UNIX™/Linux™ servers, and can also concentrate traffic. The proxy 32 may be required for auditing agentless Windows™ based server if the master server 14 is running another operating system such as UNIX™ or Linux™.

The master server 14 is capable of connecting to the slave servers 28 for performing audits of configuration settings, workload etc. and thus can communicate over several applicable protocols, e.g. simple network management protocol (SNMP). As shown a computer station 16 running a web browser and connected to a web server (not shown) on the master server 14, e.g. over HTTP, can be used to operate the analysis program 10 in the environment 12. The analysis program 10 may reside on the master server 14 or may run on a remote server (not shown). The analysis program 10 can gather data as it is available or retrieve a block of data from the master server 14 either via electronic means or other physical means. As such, the analysis program 10 can operate in the environment 12 or independently (and remote thereto) so long as it can obtain audited data from the environment 12. The computer station 16 enables the analysis program 10 to display reports and gather user input for executing an audit or analysis.

A example block diagram of the analysis program 10 is shown in FIG. 7. The flow of data through the program 10 begins as an audit engine 46 pulls audit data from audited environments 50. The data works its way up to the web client 34 which displays an output on a web interface, e.g. on computer system 16.

The audit engine 46 communicates over one or more connections referred to generally by numeral 48 with audited environments 50 which are the actual systems 28, e.g. server machines, that are being analysed. The audit engine 46 typically uses data acquisition (DAQ) adapters to communicate with the end points (e.g. servers 28) or software systems that manage the end points (e.g. management frameworks 52 and/or agent instrumentation 54). The program 10 can utilize management framework adapters 52 in the audited environments 50 for communicating with ESM frameworks and agent instrumentation and for communicating with other agents such as a third party or agents belonging to the program 10. The audit engine 46 can also communicate directly with candidate and/or target systems 28 using agentless adapters (central arrow in FIG. 7) to gather the necessary audit information.

An audited data repository 42 is used to store audit information and previous reports. The audit engine 46, using a set of audit templates 45, controls the acquisition of data that is used by the other software modules to eventually generate a set of reports to display on the interface 34. The context engine 40 utilizes metadata 39 stored by the program 10, which indicates the nature of the data, to filter out extraneous information.

The analysis engine 41 evaluates data compared in a differential engine 38 based on a set of rules 43. The analysis engine 41 performs the compatibility and, in this example, the consolidation analysis to determine if the environment 12 can operate with fewer systems 28.

The report generation tool 36 utilizes the set of report templates 35 for generating custom reports for a particular environment 12. The report generation tool 36 utilizes the information generated by the analysis engine 41. Typically, the program 10 includes a web client 34 for communicating with a web interface (e.g. on computer system 16). The web interface allows a user to enter settings, initiate an audit or analysis, display reports etc.

In the following examples, a source system refers to a system from which applications and/or data are to be moved, and a target server or system is a system to which such applications and/or data are to be moved. For example, an underutilized environment having two systems 28 can be consolidated to a target system (one of the systems) by moving applications and/or data from the source system (the other of the systems) to the target system.

The rules 43 and rule sets 76 can be used to evaluate systems 28 to determine compatibilities based on the differences between pairs of systems 28 and the relative importance of such differences to the compatibilities. The evaluation can be used for consolidation analysis, compliance measures etc. For example, as system compatibility index (SCI) for each pair in a plurality of systems 28 can be obtained that represents the compatibility of the systems 28 from a configuration standpoint.

A system configuration compatibility analysis f N systems 18 computes N×N system compatibility scores by individually considering each system 18 as a consolidation source and as a target. Preferably, the scores range from 0 to 100 with higher scores indicating greater system compatibility. The analysis will thus also consider the trivial cases where systems are consolidated with themselves and would be given a maximum score, e.g. 100. For display and reporting purposes, the scores are preferably arranged in an N×N matrix form.

Figure 9:
FIG. 9 is a server compatibility index (SCI) matrix.

An example of an SCI matrix 60 is shown in FIG. 9. The SCI matrix 60 provides an organized graphical mapping of system compatibility for each source/target system pair on the basis of configuration data. The SCI matrix 60 shown in FIG. 9 is structured having each server 28 in the environment 12 listed both down the leftmost column 64 and along the uppermost row 62. Each row represents a consolidation source system, and each column represents the possible consolidation target. Each cell contains the score corresponding to the case where the row system is consolidated onto the column (target) system.

The preferred output shown in FIG. 9 arranges the servers 28 in the matrix such that a 100% compatibility exists along the diagonal 63 where each server is naturally 100% compatible with itself. The SCI matrix 60 is preferably displayed such that each cell 66 includes a numerical score and a shade of a certain colour. As noted above, the hi-her the score (from zero (0) to one hundred (100)), the higher the compatibility. The scores are pre-classified into predefined ranges that indicate the level of compatibility between two systems 18. Each range maps to a corresponding colour or shade for display in the matrix 60. For example, the following ranges and colour codes can be used: score=100, 100% compatible, dark green; score 75-99, highly compatible, green; score=50-74, somewhat compatible, yellow; score=25-49, low compatibility, orange; and score=0-24, incompatible, red.

The above ranges are only one example. Preferably, the ranges can be adjusted to reflect more conservative and less conservative views on the compatibility results. The ranges can be adjusted using a Graphical tool similar to a contrast slider used in graphics programs. Adjustment of the slider would correspondingly adjust the ranges and in turn the colours. This allows the results to be tailored to a specific situation.

It is therefore seen that the graphical output of the SCI matrix 60 provides an intuitive mapping between the source/target pairs in the environment 12 to assist in visualizing where compatibilities exist and do not exist. In FIG. 9 it can be seen that the server pair identified with an asterisk (*) and by the encircled cell indicates complete compatibility between the two servers for the particular strategy being observed, e.g. based on a chosen rule set. It can also be seen that the server pair identified with an X and the encircled cell at the corresponding row/column crossing comprises a particularly poor score and thus for the strategy being observed, the servers 28 in that pair are not very compatible.

The scores are calculated based on configuration data that is acquired through a configuration audit performed by the analysis program 10. The data is acquired using tools such as the table 100 shown in FIG. 8 that illustrate the various types of configuration settings that are of interest and from which sources they can be obtained. In FIG. 8, a number of strategies 104 and sub-strategies 105 map to various configuration sources, collectively referred to by numeral 102. Each strategy 104 includes a set of sub-strategies 105, which in turn map to specific rule sets 43.

The table 100 lists the supported consolidation strategies and the relevant data sources that should be audited to perform the corresponding consolidation analysis. In general, collecting more basis data improves the analysis results. The table 100 enables the analysis program 10 to locate the settings and information of interest based on the strategy 104 or sub-strategy 105 (and in turn the rule set) that is to be used to evaluate the systems 28 in the environment 12. The results can be used to determine source/target candidates for analysing the environment for the purpose of, e.g. consolidation, compliance measures etc.

The score provided in each cell indicates the configuration compatibility for consolidating pairs of servers. The matrix 60 provides a visual representation of the compatibilities and an intuitive way to evaluate the likelihood that systems can be consolidated and have associated tools (as explained below) that can be used to analyse compliance and remediation measures to modify systems 28 so that they can become more compatible with other systems 28 in the environment 12. It can therefore be seen that a significant amount of quantitative data can be analysed in a convenient manner using, the graphical matrix 60 and associated reports and graphs (described below).

For example, a server pair that is not compatible only for the reason that certain critical software upgrades have not been implemented, the information can be uncovered through analysis tools used with the SCI matrix 60, and then investigated, so that upgrades can be implemented, referred to herein as remediation. Remediation can be determined by modeling cost of implementing upgrades, fixes etc that are needed in the rule sets. If remediation is then implemented, a subsequent analysis may then show the same server pair to be highly compatible and thus suitable candidates for consolidation.

The SCI matrix 60 can be sorted in various ways to convey different information. For example, sorting algorithms such as a simple row sort, a simple column sort and a sorting by group can be used.

A simple row sort involves computing the total scores for each source system (by row), and subsequently sorting the rows by ascending total scores. In this arrangements the highest total scores are indicative of source systems that are the best candidates to consolidate onto other systems.

A simple column sort involves computing the total scores for each target system (by column) and subsequently sorting the columns by ascending total score. In this arrangement, the highest total scores are indicative of the best consolidation target systems.

Sorting by group involves computing the difference between each system pair, and arranging the systems to minimize the total difference between each pair of adjacent systems in the matrix. The difference between a system pair can be computed by taking the square root of the sum of the squares of the difference of a pair's individual compatibility score against each other system in the analysis. In general, the smaller the total difference between two systems, the more similar the two systems with respect to their compatibility with the other systems. The group sort promotes the visualization of the logical breakdown of an environment by producing clusters of compatible systems 18 around the matrix diagonal. These clusters are indicative of compatible regions in the environment 12.

Figure 17:
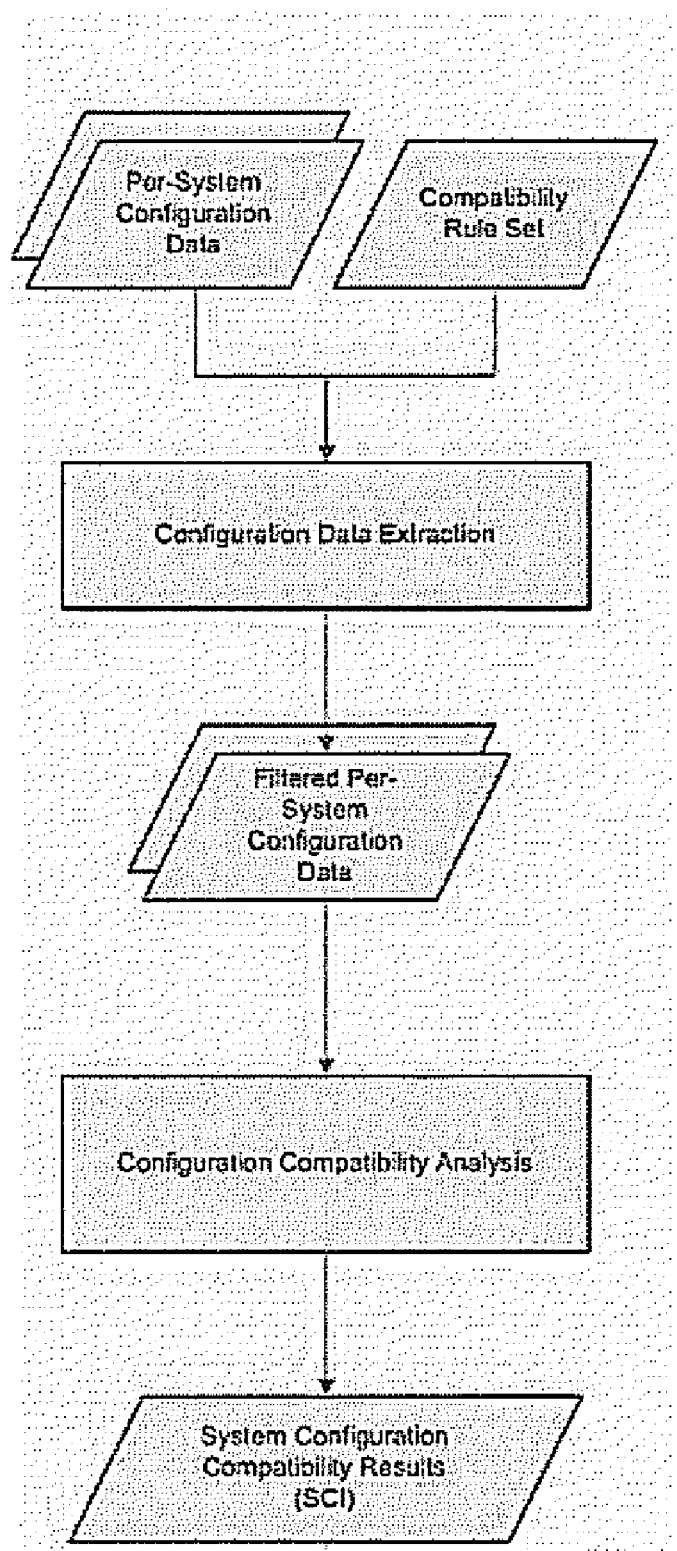
FIG. 17 is a flowchart illustrating a system compatibility analysis procedure including the application of a rule set.

The following illustrates an example for generating the SCI matrix 60 discussed above. FIG. 17 shows generally a configuration compatibility analysis. A configuration data extraction process is performed using per-system configuration data and a compatibility rule set. The configuration data extraction process produced filtered per-system configuration data and this filtered data is used to perform the configuration compatibility analysis to in turn produce system compatibility results, e.g., including SCI scores in a SCI matrix 60.

Figure 18:
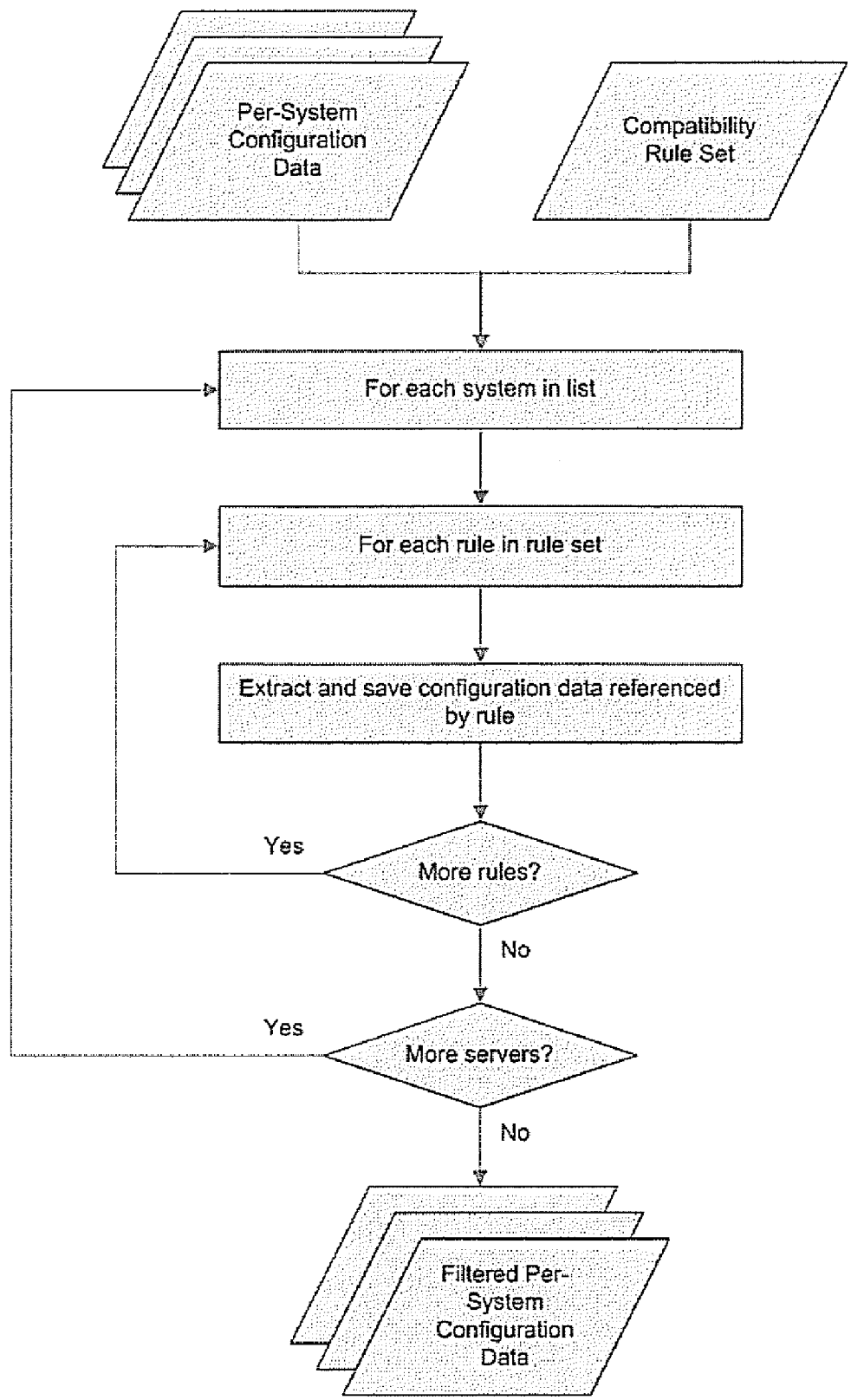
FIG. 18 is a flowchart illustrating a configuration data extraction procedure.

The configuration data extraction step is shown in greater detail in FIG. 18. The per-system configuration data comprises a data set for each system 28 that is obtained during the auditing process. The compatibility rule set defines which settings are important for determining compatibility. As discussed above, the compatibility rule set is typically a predefined set of rules which can be revised as necessary based on the specific environment 12. The rule set is thus preferably compiled according to the target systems being analysed and prior knowledge of what makes a system compatible with another system for a particular purpose.

Configuration data extraction analyses the per-system configuration data and the compatibility rule sets 76. Each system is analysed for each rule 43 in the rule set 76. For each rule, the configuration data referenced by the rule (according to its definition) is extracted and saved by the analysis engine 41. The extraction process results in a filtered data set for each system 28 that corresponds to the actual configuration data that can be used to determine compatibilities between the systems 28. The filtered data is used for the compatibility analysis.

Figure 19:
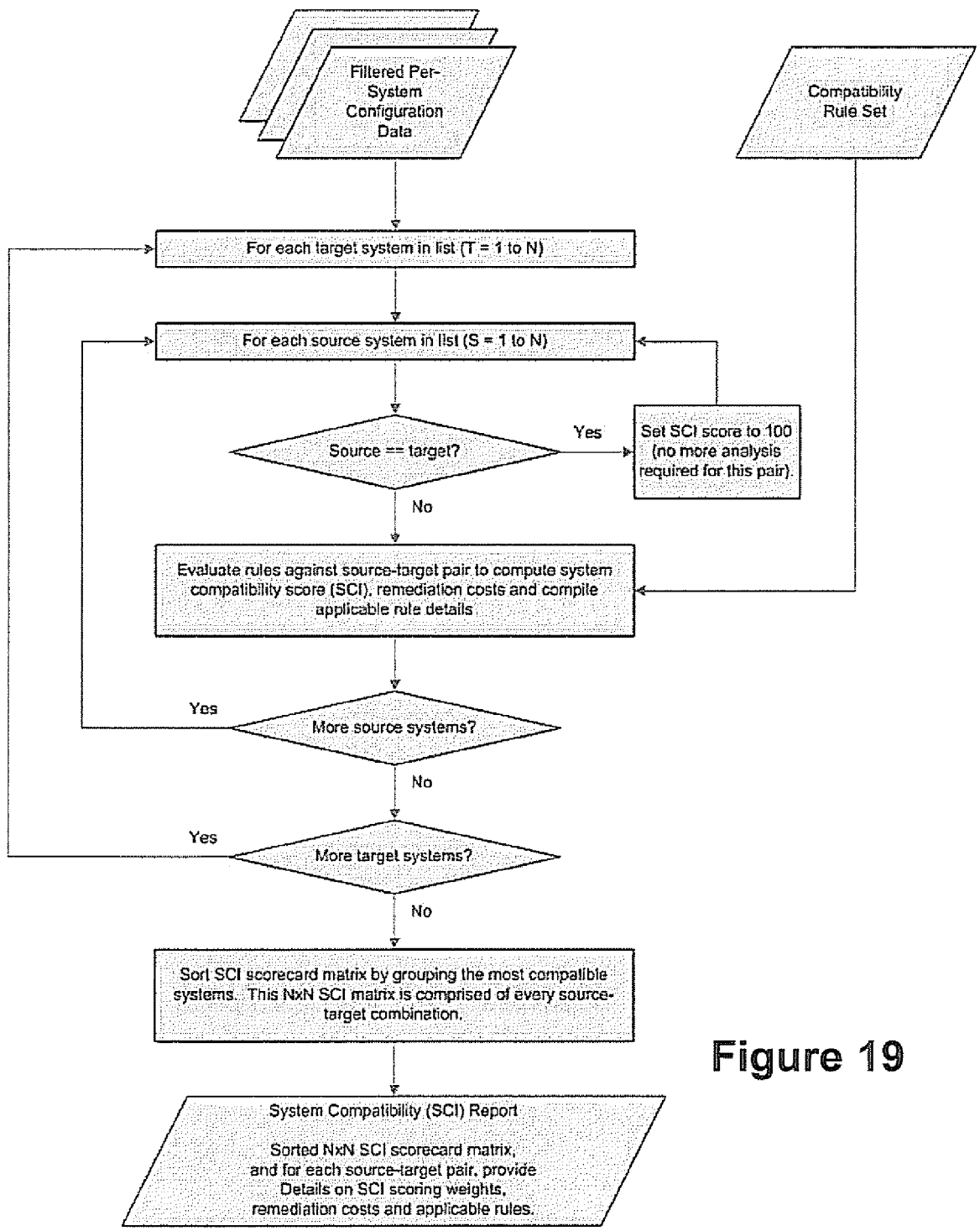
FIG. 19 is a flowchart illustrating a configuration compatibility analysis procedure.
Figure 20:
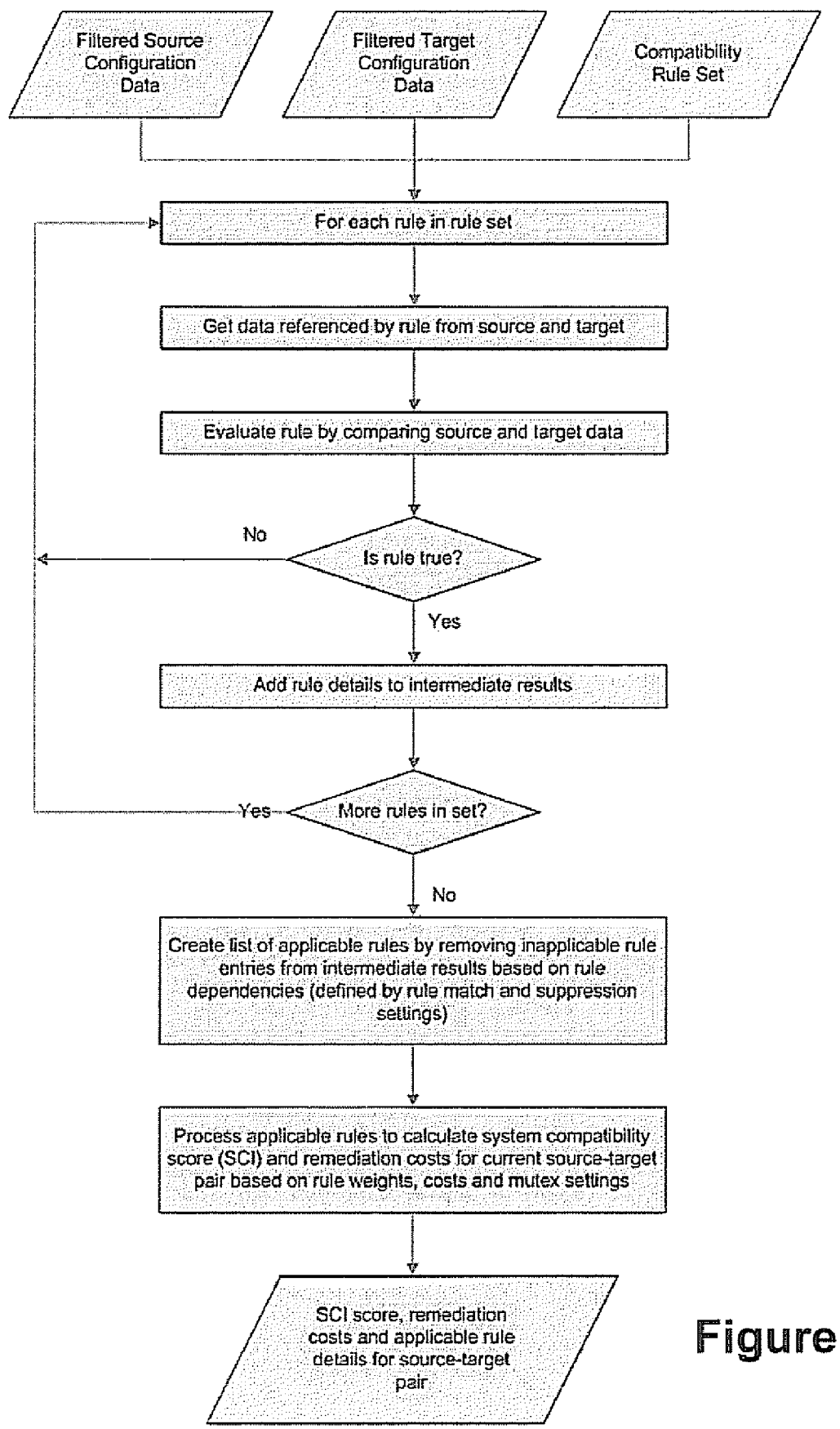
FIG. 20 is a flowchart illustrating a rule set application procedure.

An exemplary configuration compatibility analysis procedure is shown in FIGS. 19-20. When analyzing system compatibility, the list of tar-et and source systems 28 are the same. The compatibility is evaluated in two directions, e.g. for a Server A and a Server B, migrating A to B is considered as well as migrating B to A.

Turning first to FIG. 19, for each target system T (T=1 to N where N is the number of systems), the differential engine 38 first looks at each source system S (S=1 to N). If the source-target then the SCI score for that source is set to 100, no further analysis is required and the next pair is analyzed. If the source and target are different, the rules are evaluated against the source/target pair to compute the SCI score, remediation cost and to compile the associated rule details. Estimated remediation costs are optionally specified with each rule item. As part of the rule evaluation and subsequent SCI score calculation, if a rule is true (a difference is identified), the corresponding cost to address the deficiency is added to the remediation cost for the pair of systems 28 being analysed.

The evaluation of the rules is shown in FIG. 20. The evaluation of the rules considers the filtered configuration data for both the source system and the target system, as well as the compatibility rule set that is being applied. For each rule in the set, the data referenced by the rule is obtained from both the target data and source data. The rule is evaluated by having the differential engine 38 compare the data. If the rule is not true (i.e. if the systems are the same according to the rule definition) then the data is not considered in the SCI score and the next rule is evaluated. If the rule is true, the rule details are added to an intermediate result. The intermediate result includes all true rules.

Preferably, a suppression tag is included with applicable rules. As previously discussed, the suppression tag indicates other rules that are not relevant if that rule is true. For example, if the OS in a source/target pair is different, there is no need to check whether or not the patches are the same, since different OSs should invariably have different patches. The suppression flag allows the program 10 to avoid unnecessary computations. As also previously discussed, a mutex flag can be used to avoid unfairly reducing the score for each true rule when the rules are closely affected by each other. For example, if several patches are different, the score is only docked marks once, for that rule type so as to not diminish the compatibility score due to only one difference seen multiple times.

Once each rule has been evaluated, a list of applicable rules is created by removing inapplicable rule entries from the intermediate results based on rule dependencies, which are defined by rule matching and suppression settings (e.g. mutex flags and suppression tags). The applicable rules are then processed to calculate the SCI score for that particular source/target pair based on the rule weights. Remediation costs are also calculated based on the cost of updating/upgrading etc. and the mutex settings.

Turning back to FIG. 19, the current target is then evaluated against all remaining sources and then the next target is evaluated. As a result, a N×N matrix can be created that shows a compatibility score for each system against each other system. The matrix can be sorted by grouping the most compatible systems. The sorted SCI matrix 60 is comprised of every source/target combination.

Preferably, an SCI report is then generated comprising the SCI matrix 60 (e.g. FIG. 9) and for each source-target pair details available pertaining to the SCI scoring weights, remediation costs and applicable rules. The details can preferably be pulled for each source/target pair by selecting the appropriate cell.

An example system configuration compatibility analysis is provided below for an arbitrary environment 12 having four servers, namely server A, server B, server C and server D.

The audit engine 46 collects detailed configuration data from the servers 28, which may include, e.g. UNIX™, Linux™, Windows™, AS/400™ etc, The process of collecting the detailed information is herein referred to as an audit. The audit engine 46 collects the data from instrumented candidate systems 12 through various protocols such as simple network management protocol (SNMP), Windows™ management instrumentation (WM), SSH etc. as shown in FIG. 6. Depending on the protocol used and the data to be collected, instrumentation 54 on the environment 12 may need to be augmented with additional software such as an agent associated with the analysis program 10.

The web client 34 and web interface allows the user to define the servers 28 to be audited, the actual data to be collected and the audit communication protocol. An example screen shot of an audit request program 110 is shown in FIG. 10.

The program 110 enables a user to name and describe the audit so that it can be later identified by entering the requisite information into the entry boxes 1112. The audit request information is included in sub-window 114 and the target server information is included in sub-window 122. The type of request, e.g. SNMP is selected using the drop-down box 116. Based on this selection, a list of request parameters are listed in sub-window 118. As shown in the example, the SNMP version and the particular port are listed as well the type of community string. It will be appreciated that any number of request parameters may be listed. Below the request parameters, sub-window 120 provides a visual list of request templates which defines the data that is to be collected and from where it can be obtained. This list can preferably be edited, e.g. by selecting the "Edit" button as shown.

Examples of the request templates that are not necessarily included in FIG. 10 are MIB-II, which includes detailed network configuration and statistical data; host resources, which includes system hardware configuration, devices, installed software, installed patches etc.; a configuration monitor, which obtains OS configuration details; a software auditor, which obtains data pertaining to installed patches; a base system workload via a system activity reporting (SAR), which obtains hourly and daily performance statistics of basis properties such as CPU, memory, swap etc.; and extended system workload via SAR, which obtains hourly and daily performance data for additional properties including file I/O, swap I/O, page faults etc. It will be appreciated that any number and form of request templates can be used based on the particular strategies being used for a particular environment 12.

The portion 122 of the audit request program 110 displays a list of the audit targets, which are each server 28 that is to be audited. In the example shown, servers A-D are listed and this list can be edited should the user wish to add or remove certain servers 28. Once the user has selected the desired settings and targets etch, they may choose an "Audit" button to begin the audit, or they may cancel the audit and/or save the audit before it runs.

The audit results are acquired by requesting information specified in the selected audit request templates from the servers 28 in the audited environments 50, and the audited data is stored. The data is then accessed by the analysis program 10 and processed to generate reports and display such reports.

Figure 11:
FIG. 11 is a detailed configuration report and detailed configuration and workload data obtained from the detailed configuration report.

A detailed configuration report 130 is shown in FIG. 11. The detailed configuration report organizes the audit data by system and category in the table 132. As shown in FIG. 11, both configuration and workload audit data can be viewed by selecting "View". The report 130 also displays audit information such as the name for the targeted audit, the type of audit and a timestamp indicating when the audit was performed.

Portions of the detailed information that has been collapsed within the configuration report can be viewed by selecting the appropriate "View" link in the report 130. An example of a detailed configuration information table 136 is also shown in FIG. 11. In the example shown, server information 138 and kernel parameters 136 are displayed with detailed data pertaining to the associated settings, kernels etc.

The system compatibility analysis, which ultimately Generates the SCI matrix 60, compares the detailed configuration settings for the candidate servers 28 with other candidate systems (not shown) based on a pre-defined rule set 43. The resulting analysis yields a system compatibility index score for each candidate server combination. As noted above, these scores are preferably arranged in the graphical SCI 60 format shown in FIG. 9 and sorted using a preferred sorting algorithm as discussed above.

The analysis program 10 supports multiple rule sets to address a variety of server consolidation strategies and scenarios, Example consolidation rule sets include those for UNIX™ systems, Windows™ systems virtualization, SQL™ servers and Oracle™ databases. As discussed, each rule specifies the important configuration property that is to be compared between the candidate servers, the criteria for comparison, a relative weight to compute the SCI score, a rule description, and any rule dependencies, Other fields may also be considered such as the source and/or target instance, conditional flags, mutex etc. An example rule set 76 arranged in a table 146 for an arbitrary system is shown in FIG. 12. Each rule 43 and its associated information is listed as a separate entry 148. Various OS settings (not all shown in FIG. 12) are assessed including the OS name, OS version, OS kernel bits, memory size, patch level, name service settings, kernel parameters, locale settings, timezone settings etc.

Total and shared memory criteria tests whether or not the target system has less memory than hypothetical systems that it could be migrated to. As can be seen from FIG. 12, a different operating system is deemed to be more important that a different time zone and thus is given a larger weight. The criticality of a rule may vary from system to system and thus the rule sets should be flexible and configurable.

The SCI score is computed for each candidate system combination by evaluating the rules based on the configuration data obtained from the audit of the environment 12. For each rule that applies to the candidate server pair, the pair's SCI score is reduced by iteratively applying the corresponding rule weight at each iteration (i.e. for each rule), from an initial value to a final value, the final value being the score. A suitable formula for calculating the SCI score is:

$$SCI_{(n+1)} = SCI_n(1-\text{Weight});$$

where $SCI_n$ is the current SCI score (initially 100) before the next rule is evaluated, $SCI_{n+1}$ is the new SCI score, and Weight is the rule weight.

For example, for an arbitrary pair of systems, if the following rules: different operating system (weight=0.5); not running the same kernel bits (weight=0.1); and target host has less memory (weight=0.05); were found to apply to a pair of servers 28, the corresponding SCI score would be computed as follows:

$$SCI_1=100(1-0.5)=50$$

$$SCI_2=50(1-0.1)=45$$

$$SCI_3=45(1-0.05)=42.75$$

Final SCI score=42.75.

As can be seen from the example above, where two servers 28 have different operating systems, different kernel bits and the target has less memory than the baseline data, the configuration compatibility for that server pair is quite low. It is therefore unlikely that these servers could be consolidated since they are not compatible at the configuration level.

The compatibility program 10 provides a user interface for performing the compatibility analysis as shown in FIG. 13. Through such an interface, users can specify the input parameters required to generate the SCI scores.

In the example shown in FIG. 13, the program 150 is used to generate a system compatibility report. An audit that has been saved is loaded into the program 150, which lists identifying information such as the timestamp, number of target servers, and the number of failed evaluations in the table 152. The user can select the report category from the drop-down list 154, e.g. optimization, inventory, change, compliance, administration etc; and can choose the report type from the drop-down list 156. The report parameters 158 may also be selected which are specific to the type of report being generated and define how the report is structured. The target information 162 is also shown and the target can be removed. Once the user has made the appropriate selections, choosing the "Generate" button creates the SCI matrix 60a shown in FIG. 14.

The SCI matrix 60a is presented as an N×N matrix, where the top of each column indicates the server on which each server listed in the first column is consolidated, and the row name indicates the server being migrated. The SCI 60 shown in FIG. 14 provides an example matrix of scores for the example environment 12 including servers A, B, C and D. The SCI scores apply to each possible server consolidation pair. The higher scores indicate more compatibility.

As noted above, a group sort can be applied to the SCI matrix 60, which includes a difference calculation. The difference calculation between a pair of systems can be illustrated making reference to the SCI matrix 60a shown in FIG. 14. From this example, the difference between server A and server B may be computed as follows:

$$\begin{aligned}Diff &= sqrt(\text{square}(S(a,a)-S(a,b)) + \text{square}(S(b,a)-S(b,b)) + \\ &\quad \text{square}(S(c,a)-S(c,b)) + \text{square}(S(d,a)-S(d,b)) + \\ &\quad \text{square}(S(a,a)-S(b,a)) + \text{square}(S(a,b)-S(b,b)) + \\ &\quad \text{square}(S(a,c)-S(b,c)) + \text{square}(S(a,d)-S(b,d))) \\ &= sqrt(\text{square}(100-90) + \text{square}(90-100) + \\ &\quad \text{square}(83-79) + \text{square}(52-52) + \\ &\quad \text{square}(100-90) + \text{square}(90-100) + \\ &\quad \text{square}(83-79) + \text{square}(57-57))\end{aligned}$$

where sqrt represents a square root operation.

The detailed differences shown in FIGS. 15 and 16 can be viewed by clicking on the relevant cell 66. As can be seen in the example, migrating server C to server D yields a score of 57.

Selecting this cell accesses the detailed differences table 178 shown in FIG. 16, which shows the important differences between the two systems, the rules and weights that were applied and preferably a remediation cost for making the servers more compatible, the data being collectively referred to by numeral 176. As shown in FIG. 15, a summary differences table 170 may also be presented when selecting a particular cell, which lists the description of the differences 174 and the weight applied for each difference, to give a high level overview of where the differences arise.

The SCI matrix 60 may then be used along with a workload compatibility index (WCI) matrix to perform an overall cohabitation analysis as described in co-pending U.S. patent application Ser. No. 11/535,355 filed on Sep. 26, 2006, and entitled "System and Method for Determining Compatibility of Computer Systems", the contents of which are incorporated herein by reference.

It will be appreciated that rules may instead be used for purposes other than consolidation such as capacity planning, regulatory compliance, change, inventory, optimization, administration etc. and any other purpose where the compatibility and/or differences between systems is useful for analyzing systems 28. It will also be appreciated that the program 10 may also be configured to allow user-entered attributes (e.g. location) that are not available via the auditing process and can factor such attributes into the rules and subsequent analysis.

It will further be appreciated that although the examples provided above are in the context of a distributed system of servers, the principles and algorithms discusses are applicable to any system having a plurality of sub-systems where the sub-systems perform similar tasks and thus are capable theoretically of being consolidated. For example, a local network having a number of personal computers (PCs) could also benefit from a consolidation analysis, data in databases could be consolidated etc.

Although the invention has been described with reference to certain specific embodiments, various modifications thereof will be apparent to those skilled in the art without departing from the spirit and scope of the invention as outlined in the claims appended hereto.

What is claimed is:

1. A method of evaluating differences in parameters for one or more computer systems comprising:

a processor obtaining from a data storage device, a first data set pertaining to a plurality of parameters of a first computer system and obtaining from said data storage device, a second data set pertaining to said plurality of parameters for a second computer system to permit comparison of corresponding parameters for said computer systems by comparing each parameter in said first data set to the corresponding parameter in said second data set, wherein said first and second computer systems can be different systems or a same system at different times;

said processor referencing one or more differential rule definitions for selecting one or more particular parameters to be evaluated, said rule definitions including weights indicative of relative importance of differences in said particular parameters as they relate to operation of said systems, one or more of said rule definitions including one or more suppression flags to model dependencies between rule definitions to control whether a particular rule definition is executed based on the result of execution of one or more dependent rule definitions;

for each rule definition, subject to said dependencies derived from said suppression flags, said processor:

i. comparing values for said particular parameters in said first data set to corresponding values for said particular parameters in said second data set;

ii. from said comparing, said processor determining if differences exist between said corresponding values in said data sets;

iii. if said differences exist, said processor determining weights corresponding to said particular parameters from said rule definition, said weights being indicative of the relative importance of said differences for said particular parameters; and said processor using weights determined for any differences in said plurality of parameters to generate an evaluation of said computer systems against one another.

2. A method according to claim 1, said first data set for a baseline computer system and said second data set for a target computer system, said baseline and target computer systems being different systems.

3. A method according to claim 1, wherein said first data set and said second data set are indicative of the state of said same system at different times.

4. A method according to claim 1 wherein said evaluation comprises a score which is computed by iteratively reducing an initial value to produce a final value and applying one of said weights at each iteration, said final value being used as said score.

5. A method according to claim 1 comprising generating a report including a score for said evaluation and displaying said report on an interface.

6. A method according to claim 1 for evaluating a plurality of different computer systems comprising evaluating each pair of said plurality of computer systems according to said differential rule definition and computing a plurality of scores according to said weight.

7. A method according to claim 6 comprising generating a graphical interface for displaying said plurality of scores, said graphical interface comprising a matrix of cells, each said cell corresponding to a pair of said plurality of computer systems, each row of said matrix indicating one of said plurality of computer systems and each column of said matrix indicating one of said plurality of computer systems, each cell displaying a respective one of said plurality of scores indicating the compatibility of the respective pair of said plurality of systems indicated in the corresponding row and column, and computed according to said weights.

8. A method according to claim 1 wherein said parameter can be such things as: operating system (OS) type, OS version, time zone, total memory, OS patch level, and OS kernel bits.

9. A method according to claim 1 further comprising said processor referencing a mutex flag in said rule definition to determine whether or not multiple matches in said rule definition incur a single penalty in said evaluation.

10. A method according to claim 1 further comprising said processor determining a remediation cost representing the cost of eliminating a deficiency in said configuration parameter in one of said first and second data sets according to the same parameter in the other of said data sets and providing said remediation cost with said evaluation.

11. A computer readable medium comprising computer executable instructions for evaluating differences in parameters for one or more computer systems, said computer readable medium comprising instructions for:

obtaining from a data storage device, a first data set pertaining to a plurality of parameters of a first computer system and obtaining from said data storage device, a second data set pertaining to said plurality of parameters for a second computer system to permit comparison of corresponding parameters for said computer systems by comparing each parameter in said first data set to the corresponding parameter in said second data set, wherein said first and second computer systems can be different systems or a same system at different times;

referencing one or more differential rule definitions for selecting one or more particular parameters to be evaluated, said rule definitions including weights indicative of relative importance of differences in said particular parameters as they relate to operation of said systems, one or more of said rule definitions including one or more suppression flags to model dependencies between rule definitions to control whether a particular rule definition is executed based on the result of execution of one or more dependent rule definitions;

for each rule definition, subject to said dependencies derived from said suppression flags:

i. comparing values for said particular parameters in said first data set to corresponding values for said particular parameters in said second data set;

ii. from said comparing, determining if differences exist between said corresponding values in said data sets;

iii. if said differences exist, determining weights corresponding to said particular parameters from said rule definition, said weights being indicative of the relative importance of said differences for said particular parameters; and using weights determined for any differences in said plurality of parameters to generate an evaluation of said computer systems against one another.

12. A computer readable medium according to claim 11, said first data set for a baseline computer system and said second data set for a target computer system, said baseline and target computer systems being different systems.

13. A computer readable medium according to claim 11, wherein said first data set and said second data set are indicative of the state of said same system at different times.

14. A computer readable medium according to claim 11 wherein said evaluation comprises a score which is computed by iteratively reducing an initial value to produce a final value and applying one of said weights at each iteration, said final value being used as said score.

15. A computer readable medium according to claim 11 comprising instructions for generating a report including a score for said evaluation and displaying said report on an interface.

16. A computer readable medium according to claim 11 configured for evaluating a plurality of different computer systems comprising instructions for evaluating each pair of said plurality of computer systems according to said differential rule definition and computing a plurality of scores according to said weight.

17. A computer readable medium according to claim 16 comprising instructions for generating a graphical interface for displaying said plurality of scores, said graphical interface comprising a matrix of cells, each said cell corresponding to a pair of said plurality of computer systems, each row of said matrix indicating one of said plurality of computer systems and each column of said matrix indicating one of said plurality of computer systems, each cell displaying a respective one of said plurality of scores indicating the compatibility of the respective pair of said plurality of systems indicated in the corresponding row and column, and computed according to said weights.

18. A computer readable medium according to claim 11 wherein said parameter can be such things as: operating system (OS) type, OS version, time zone, total memory, OS patch level, and OS kernel bits.

19. A computer readable medium according to claim 11 further comprising instructions for referencing a mutex flag in said rule definition to determine whether or not multiple matches in said rule definition incur a single penalty in said evaluation.

20. A computer readable medium according to claim 11 further comprising instructions for determining a remediation cost representing the cost of eliminating a deficiency in said configuration parameter in one of said first and second data sets according to the same parameter in the other of said data sets and providing said remediation cost with said evaluation.

* * * * *